C. HUNNICUTT.
SEED CORN GRADER.
APPLICATION FILED OCT. 26, 1908.
1,027,734.
Patented May 28, 1912.
2 SHEETS—SHEET 1.
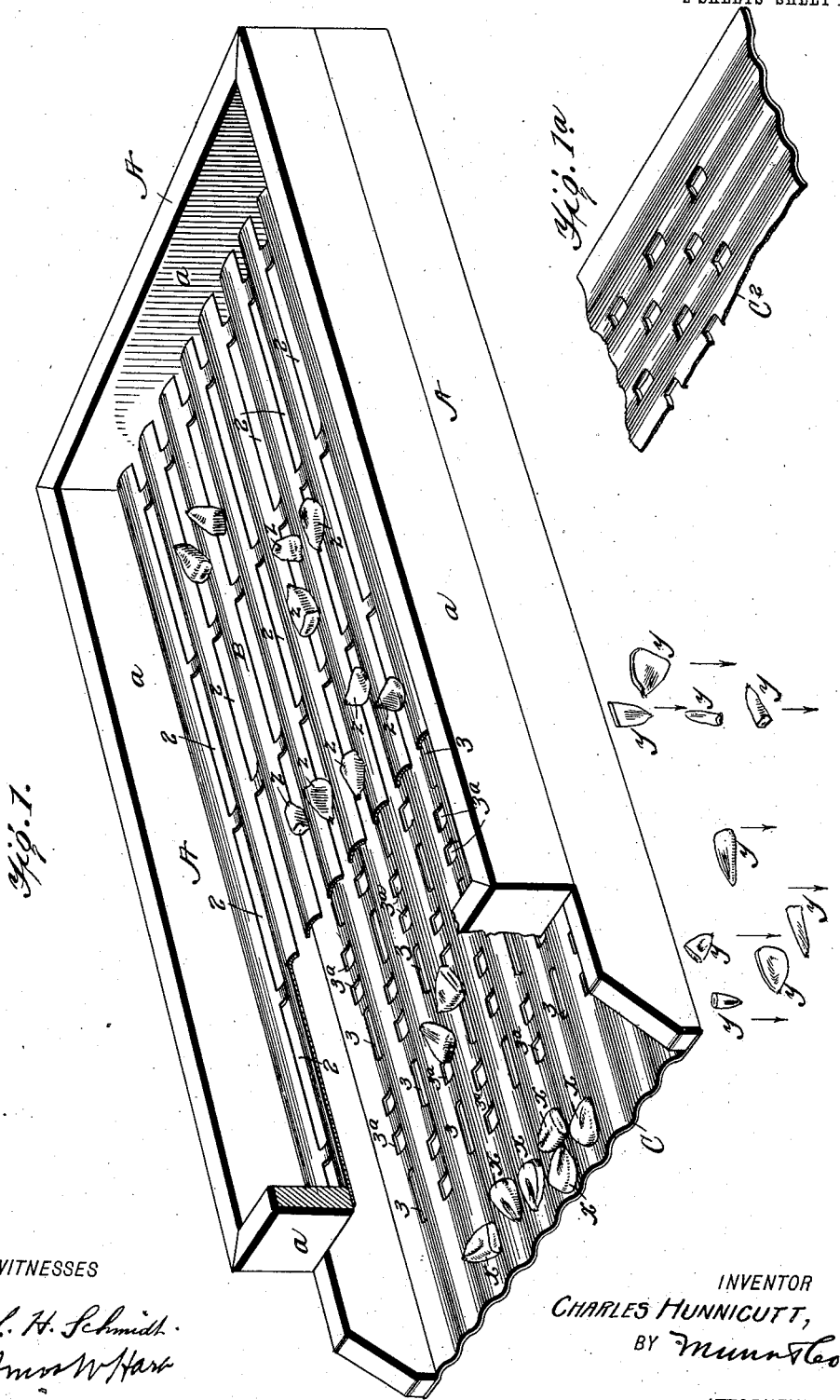
WITNESSES
INVENTOR
CHARLES HUNNICUTT,
BY
ATTORNEYS

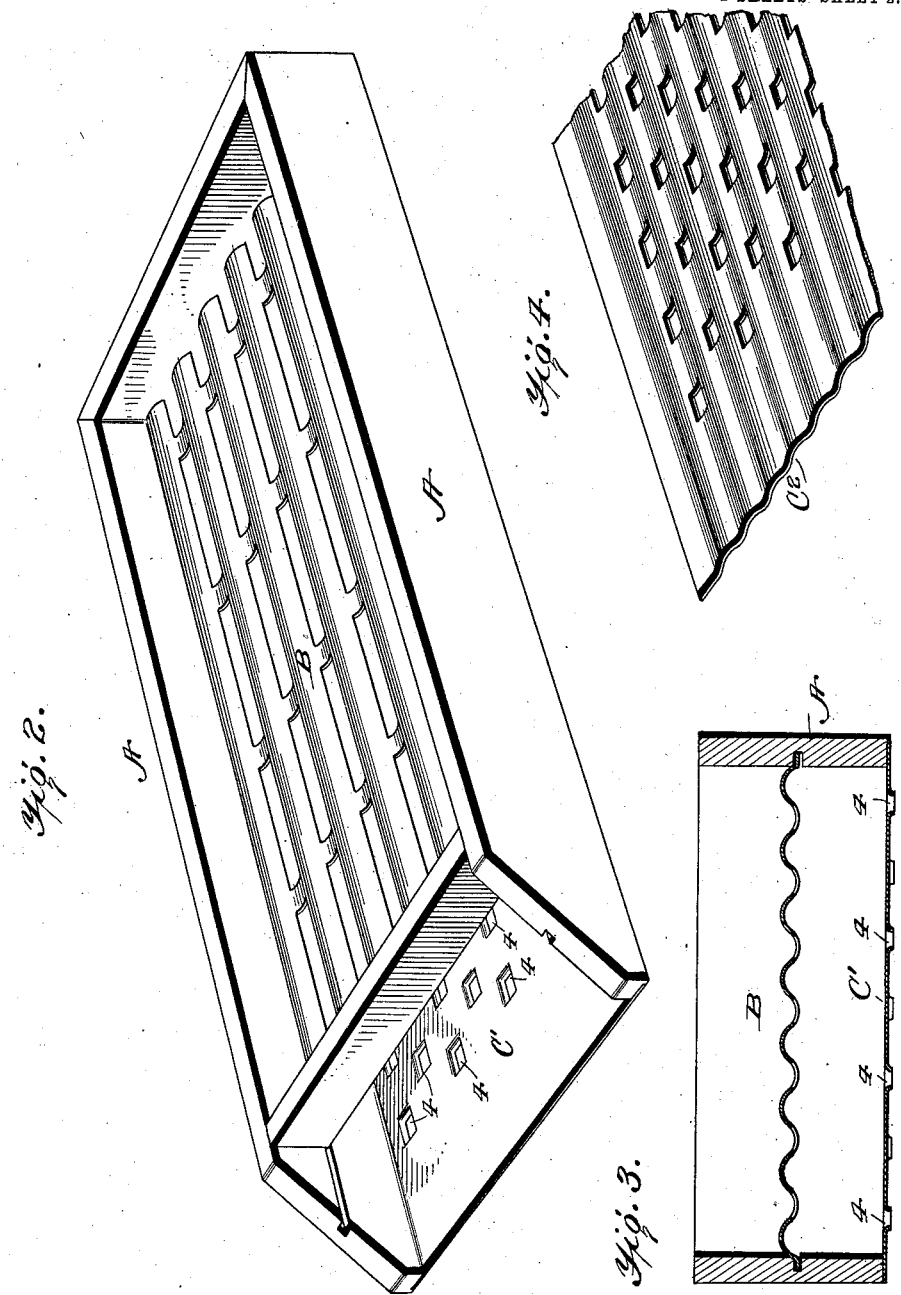

UNITED STATES PATENT OFFICE.

CHARLES HUNNICUTT, OF WILMINGTON, OHIO, ASSIGNOR TO THE CHARLES HUNNICUTT COMPANY, OF CLINTON COUNTY, OHIO, A CORPORATION OF OHIO.

SEED-CORN GRADER.

1,027,734.  Specification of Letters Patent.  Patented May 28, 1912.

Application filed October 26, 1908. Serial No. 459,502.

*To all whom it may concern:*

Be it known that I, CHARLES HUNNICUTT, a citizen of the United States, residing at Wilmington, in the county of Clinton, State of Ohio, have invented an Improvement in Seed-Corn Graders, of which the following is a specification.

Corn selected for seed is usually separable into four grades of which only those kernels which are the largest and most symmetrical are desirable for planting and reproduction, besides being adapted to be dropped far more uniformly by automatic planting machines than is possible in the case of other smaller, thinner, or irregularly-shaped kernels. The demand for a hand-operable mechanical grader which will quickly effect separation of the best grade of kernels from the inferior ones, with the desired perfection, has led to various attempts to supply the market, but without the expected success.

After many experiments I have succeeded in producing, and have put in successful practical use, a grader which fulfils all requirements. It is constructed of a size adapted to be shaken and otherwise manipulated manually to effect the instant separation and discharge of the largest symmetrical kernels, and, when inverted, to dislodge the thick, irregularly shaped ones.

The details of construction are as hereinafter described and illustrated in the accompanying drawings, in which—

Figure 1 is a perspective view of a preferred form of my improved grader. Fig. 1ª is a detail perspective of a modification of the lower screen of the grader shown in Fig. 1. Fig. 2 is a perspective view of the grader having a modified construction of the lower screen. Fig. 3 is a cross section of the grader shown in Fig. 2. Fig. 4 is a perspective view of a modified construction of the lower screen.

Referring, in the first instance, to the grader shown in Figs. 1 and 1ª, A indicates an oblong rectangular wooden frame, and B and C two screens which are arranged therein parallel or approximately parallel, but separated by a considerable space. The lower portion of the frame incloses such space on three sides, the fourth being open as shown. The rectangular top portion a, of the frame is raised above the upper screen B and thus forms a hopper or receptacle for seed-corn which is to be graded. The upper screen B has a series of longitudinal rows of oblong holes or slots 2. This screen is corrugated lengthwise, the bars which separate the slots, being thus convex on the upper side, which facilitates the assemblage of kernels in the openings 2. The longitudinal bars are connected by narrow bridge pieces as shown, so that the screen as a whole has due rigidity. It may be cheaply produced by stamping and cutting out of a sheet of thin metal. The lower screen C is also corrugated lengthwise, and in the bottoms of the corrugations there are formed elongated slots or openings 3, and shorter openings 3ª, the two forms being preferably alternated, as shown. In this instance, as in the case of the upper screen B, the lengthwise corrugations of the screen facilitates the entrance of the kernels into the openings 2 and 3. In order to still further facilitate this operation, the edges of the openings may be turned downward, as shown in Fig. 1ª.

In operating the grader, it is held in the hand, and a quantity of seed-corn being placed in the hopper provided by the raised portion $a$ of the frame, the grader is shaken, by which means all the kernels, save those which are thick and irregular in form, will pass through the slots 2 and thus be received on the lower screen C. The smaller and thinner kernels pass through the openings 3, 3ª, in screen C, while the larger, more perfect, or symmetrical ones are retained and discharge from the grader by falling over the free end of the screen C. In order that this operation may be more clearly understood, the largest and most symmetrical kernels are indicated in the drawing by $x$, the smallest kernels by $y$, and the thick irregular kernels, which are prevented from passing through the upper screen B, are indicated by $z$, as shown in the drawing. When the batch of corn deposited in the hopper has been thus graded, all the thick irregular ones being left on the upper screen or sticking in the slots 2 thereof, it is requisite to invert the grader, or turn it bottom upward, in order to dislodge them.

By making the openings 2 of the upper screen B, long, as shown, the passage of kernels through the same is facilitated. The oblong openings 3 in the lower screen C permit the passage of broad, thin kernels which are not desirable for planting, while the slightly wider openings 3ª permit the passage of the smallest kernels, which may be, however, thicker than the broader ones. All the kernels *x* which have the most perfect form and the largest size cannot pass through either of the openings 3, 3ª, and hence are separated and discharged, as before stated.

In Figs. 2 and 3, I show a modification in which the upper screen B is constructed the same as the screen B in Fig. 1. The lower screen C' is, however, flat instead of being corrugated and is provided with a series of rectangular openings having depressed lips or flanges, as shown in Fig. 3, this form being required when the lower screen is flat in order to facilitate rapid discharge of the small and thin kernels through the screen.

In Fig. 4, I show a modification of the lower screen, which is indicated by C², the same being corrugated lengthwise, similarly to the screen C, shown in Fig. 1. In this case, owing to transverse curvature of the corrugations, the passage of the corn into the slots is facilitated.

By the construction of a grader in the manner above described, the perfect-shaped kernels of different varieties of field corn which are practically uniform in size and thickness, may be easily and rapidly separated from the smaller or defective ones. In practice, it is preferred that the grader be constructed about eighteen inches in length by twelve inches in width, so that the hopper *a* may be adapted to receive from one to two quarts of corn for each grading operation.

It is obvious that in order to enable the grading operation to be effected with the desired perfection of result, the width of the respective openings in the upper screen can have but a very limited range of variation. In practice, a width of about 14/64 of an inch is preferred. Such size will permit the passage of the large and perfect kernels, and also the thin but broad kernels, and the smallest ones, while the lower screen must be provided with openings which are either less in width or less in length than those of the upper screen so that the perfect kernels *x* will not pass through.

What I claim is:

1. In a corn grader, the combination with upper and lower rectangular screens corrugated longitudinally and in parallelism, and having differently sized perforations extending longitudinally in the valleys of the corrugations, the lower screen being continued beyond the upper screen at one end into a corrugated imperforate spout, of a frame surrounding the perforated area of the upper screen and rising above it to form a hopper, the lower portion of said frame engaging and supporting said lower screen at one end and both sides of said screen, the sides of said frame below said upper screen being extended to engage and support the corrugated imperforate spout.

2. A hand seed corn grader comprising a frame having an opening in the lower part of one end, and two sheet metal screens longitudinally corrugated and arranged in said frame and separated from each other, the upper located below its top and above said opening and provided with perforations in the valleys of said corrugations elongated in the direction of the length of the frame, and the lower leading to said opening and provided with perforations of the same width as those in the upper screen, but shorter, said lower screen extending outwardly beyond the upper screen, said extended portion being imperforate to form a spout.

3. A hand seed corn grader comprising a frame having an opening in the lower part of one end, and two sheet metal screens arranged in said frame and separated from each other, the upper located below its top and above said opening and provided with perforations elongated in the direction of the length of the frame, and the lower leading to said opening and provided with perforations of the same width as those in the upper screen but shorter, for the purpose set forth.

4. A hand seed corn grader comprising a frame having an opening in the lower part of one end, and two sheet metal screens arranged in said frame and separated from each other, the upper located below its top and above said opening and provided with perforations elongated in the direction of the length of the frame, and the lower leading to said opening and provided with perforations of the same width as those in the upper screen, but shorter, said lower screen extending outwardly beyond the upper screen, said extended portion being imperforate to form a spout.

CHARLES HUNNICUTT.

Witnesses:
 Joe T. Doan,
 R. C. Stumm.